United States Patent
Oroskar et al.

(10) Patent No.: US 9,479,949 B1
(45) Date of Patent: Oct. 25, 2016

(54) CUSTOMIZED DISPLAY BANNER INDICATING CALL QUALITY

(71) Applicant: Sprint Spectrum L.P., Overland Park, KS (US)

(72) Inventors: Siddharth S. Oroskar, Overland Park, KS (US); Timothy W. Sill, Platte City, MO (US); George C. Ledgerwood, Lenexa, KS (US); Philip J. Kopp, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 216 days.

(21) Appl. No.: 14/314,843

(22) Filed: Jun. 25, 2014

(51) Int. Cl.
*H04B 17/00* (2015.01)
*H04W 24/02* (2009.01)
*H04W 68/00* (2009.01)

(52) U.S. Cl.
CPC ............ *H04W 24/02* (2013.01); *H04W 68/00* (2013.01)

(58) Field of Classification Search
CPC ............ H04W 24/00; H04B 17/0065; H04B 17/0042; H04B 17/0057; H04M 1/72519
See application file for complete search history.

(56) References Cited

U.S. PATENT DOCUMENTS

| | | | | |
|---|---|---|---|---|
| 2010/0279653 | A1* | 11/2010 | Poltorak | H04M 15/00 455/410 |
| 2011/0294501 | A1* | 12/2011 | Wang | H04L 69/24 455/426.1 |
| 2012/0123775 | A1* | 5/2012 | Murgia | G10L 21/0364 704/228 |
| 2013/0250786 | A1* | 9/2013 | Balasaygun | H04L 41/5032 370/252 |
| 2015/0181491 | A1* | 6/2015 | Van Phan | H04W 28/08 370/331 |

* cited by examiner

*Primary Examiner* — Xin Jia (57) ABSTRACT

A system and method for displaying a customized banner on a wireless communication device (WCD) indicating call quality. A WCD operating in a wireless communication system that include a first base station can receive from the first base station a first message that includes a first specific indication confirming that a particular mode of high quality voice communication has become active on an end-to-end basis for an existing voice call between the WCD and a different WCD operating in the wireless communication system. In response to determining that the first message includes the first specific indication, the WCD can a particular icon signifying that the particular mode of high quality voice communication has become active.

20 Claims, 6 Drawing Sheets

CUSTOMIZED DISPLAY BANNER INDICATING CALL QUALITY

BACKGROUND

In a typical cellular radio communication system (wireless communication system), an area is divided geographically into a number of cell sites, each defined by a radio frequency (RF) radiation pattern from a respective antenna or antenna system. The antennas in the cells are in turn coupled to one or another form of controller, which is then coupled to a telecommunications switch or gateway, such as a mobile switching center (MSC) and/or a packet data serving node (PDSN) for instance. These (and possibly other) elements function collectively to form a Radio Access Network (RAN) of the wireless communication system. The switch or gateway may then be coupled with a transport network, such as the PSTN or a packet-switched network (e.g., the Internet).

Depending on the specific underlying technologies and architecture of a given wireless communication system, the RAN elements may take different forms. In a code division multiple access (CDMA) system configured to operate according to IS-2000 and IS-856 standards, for example, the antenna system is referred to as a base transceiver system (BTS), and is usually under the control of a base station controller (BSC). In a universal mobile telecommunications system (UMTS) configured to operate according to ITU IMT-2000 standards, the antenna system is usually referred to as a NodeB, and is usually under the control of a radio network controller (RNC). In a UMTS network configured to operate to Long Term Evolution (LTE) standards, evolved NodeBs (eNodeBs) may communicate directly with one another, while under functional coordination of a mobility management entity (MME). Other architectures and operational configurations of a RAN are possible as well.

A subscriber (or user) in a service provider's wireless communication system accesses the system for communication services via a Wireless Communication Device ("WCD"), such as a cellular telephone, "smart" phone, pager, or appropriately equipped portable computer, for instance. In a CDMA system a WCD is referred to as an access terminal ("AT"); in a UMTS system (including LTE) a WCD is referred to as User Equipment ("UE"). For purposes of the discussion herein, the term WCD will generally be used to refer to either an AT or UE or the like. When a WCD is positioned in a cell, it communicates via an RF air interface with the BTS, NodeB, or eNodeB antenna of the cell. Consequently, a communication path or "channel" is established between the WCD and the transport network, via the air interface, the BTS, NodeB or eNodeB, the BSC or RNC, and the switch or gateway.

As the demand for wireless communications has grown, the volume of call traffic in most cell sites has correspondingly increased. To help manage the call traffic, most cells in a wireless network are usually further divided geographically into a number of sectors, each defined respectively by radiation patterns from directional antenna components of the respective BTS, NodeB or eNodeB, or by respective antennas. These sectors can be referred to as "physical sectors," since they are physical areas of a cell site. Therefore, at any given instant, a WCD in a wireless network will typically be positioned in a given physical sector and will be able to communicate with the transport network via the BTS, NodeB or eNodeB serving that physical sector.

The functional combination of a BTS of a cell or sector with a BSC, or of a NodeB and an RNC, or an eNodeB is commonly referred to as a "base station." The actual physical of a configuration of a base station can range from an integrated BTS-BSC or NodeB-RNC unit to a distributed deployment of multiple BTSs under a single BSC, multiple NodeBs under a single RNC, or just an eNodeB. Regardless of whether it is configured to support one cell, multiple cells, or multiple sectors, a base station is typically deployed to provide coverage over a geographical area on a scale of a few to several square miles and for tens to hundreds to several thousands (or more) of subscribers at any one time.

A subscriber may move between neighboring coverage areas of base stations. More specifically, as a subscriber at a WCD moves between wireless coverage areas of a wireless communication system, such as between cells or sectors, or when network conditions change or for other reasons, the WCD may "hand off" or "handover" from operating in one coverage area to operating in another coverage area. In a usual case, this handoff process is triggered by the WCD monitoring the signal strength of various nearby available coverage areas, and the BSC or RNC (or other controlling network entity) determining when one or more threshold criteria are met. For instance, a WCD may continuously monitor signal strength from various available sectors and notify a BSC when a given sector has a signal strength that is sufficiently higher than the sector in which the WCD is currently operating. The BSC may then direct the WCD to hand off to that other sector. By convention, a WCD is said to handoff from a "source" cell or sector (or base station) to a "target" cell or sector (or base station).

In some wireless communication systems or markets, a wireless service provider may implement more than one type of air interface protocol. For example, a carrier may support one or another version of CDMA, such as EIA/TIA/IS-2000 Rel. 0, A, and CDMA 2000 Spread Spectrum Systems Revision E (collectively referred to generally herein as "IS-2000") for both circuit-cellular voice and data traffic, as well as a more exclusively packet-data-oriented protocol such as EIA/TIA/IS-856 Rel. 0, A, or other version thereof (hereafter "IS-856"). Under IS-2000, packet-data communications may be referred to as 1X Radio Transmission Technology ("1X-RTT") communications, also abbreviated as just "1x." However, since IS-2000 supports both circuit voice and packet data communications, the term 1X (or 1X-RTT) is sometimes used to more generally refer the IS-2000 air interface, without regard to the particular type of communication carried. Packet-data communications under IS-856 are conventionally referred to as Evolution-Data Optimized ("EVDO") communications, also abbreviated as just "DO." A carrier could also implement an orthogonal frequency division multiple access (OFDMA) based system according to protocols specified by third generation partnership project (3GPP) LTE Advanced, for example. WCDs may be capable of communication under any or all such protocols, and may further be capable of handing off between them, in addition to being able to hand off between various configurations of coverage areas.

OVERVIEW

Communications from a base station (or other form of access node) to a WCD are carried on a "forward link" (in a CDMA system) or "downlink" (in a UMTS/LTE network) of an air interface between the WCD and base station, and communications from a WCD to the base station are carried on "reverse link" (in a CDMA system) or "uplink" (in a UMTS/LTE network) of the air interface. By way of example, the discussion herein will be made with reference to CDMA, and the terms forward link and reverse link will therefore be adopted. However, it should be understood that discussion applies as well to uplinks and downlinks.

In a CDMA system, data sent on both the forward and reverse links are assembled into units called frames, which contain data encoded for transmission to or from the access terminal (and correspondingly, from or to the base station), and are transmitted at regular intervals (corresponding to a frame rate), typically 20 milliseconds in duration (although other transmission intervals can be used). The receiving entity (e.g., access terminal on the forward link, and the wireless network—or a network device therein—on the reverse link) decodes the encoded data in received frames to recover the original data.

Encoding typically involves compression of data from an input bit rate to an output bit rate, where the output bit rate usually requires reduced transmission bandwidth (or data storage space) compared with the input bit rate. The amount of compression achieved depends on the compression scheme or algorithm applied, including whether or not any information in the input data is lost or modified in the process (e.g., rendered in some form of analytic approximation in order to accommodate reduced "volume"). The decoding process essentially reverses the encoding process, including decompressing the compressed data. Encoding techniques, represented for example in algorithmic form, can also be developed to accommodate specific types of data, such as voice or video. The fidelity of the recovered data to the original data depends, in part, on how well the compression-decompression scheme accommodates the type of data transmitted, how well the scheme compensates for lost or modified information, and the ability of the scheme to correct for degradation due to imperfect transmission (e.g., errors, noise, etc.).

The implementation of an encoding-decoding algorithm is referred to as a "codec" (for coder/decoder), and usually takes the form of a device (e.g., a digital signal processor, or the like) and/or computer-executable instructions (e.g., software, firmware, etc.). Different codecs may implement different encoding-decoding schemes, including the ability to achieve different levels of compression and/or different degrees of protection against transmission errors, and a given codec may have different modes of operation that similarly accommodate different levels of compression and/ or different degrees of protection against transmission errors. For transmission of voice (or other audio data, for example), the encoding scheme used by a codec can also be a factor in the how well the data characterizes the input sound—i.e., the fidelity of the sound.

When a call is setup of between two WCDs, a codec can be selected for each WCD in a manner that matches their capabilities, as well as accounts for the WCDs' respective operating conditions. During the course of a call, it can be possible for a different codec to be selected, for example if operation conditions change in such a way as to warrant a change or to make change to a codec that might not have been previously supported. For example, one or another (or both) of the WCDs engaged in a call might handoff from a source cell or sector that can support an HD code to a target cell or sector that cannot. In such case, an existing HD call might be transitioned to a non-HD call. Conversely, one or another (or both) of the WCDs engaged in a call might handoff from a source cell or sector that cannot support an HD code to a target cell or sector that can. In this case, an existing non-HD call might be able to be transitioned to an HD call.

In particular, selection of a "high definition" ("HD") codec for providing HD voice can be made after a call is initially set up, or even at a later stage, after the call has proceeded for some time using a codec delivering lesser voice quality. HD voice quality is generally superior to "toll quality" voice that can be provided by an initial codec or when, as a result of a change in operating conditions for example, an HD codec is no longer supported.

Under conventional operation, a WCD engaging in a new call with another WCD does not provide any visual indication that the establish call is an HD call. Similarly, the WCD does not provide any indication that an existing HD call has transitioned to a non-HD call, or that a non-HD call has transition to an HD. Yet a visual indication that a call is an HD call, such as a banner or icon displayed in a display device of a smart-phone type WCD for example, can benefit both the user of the WCD and the network service provider. The use can benefit by being able to associate the superior voice quality of HD voice with a visual cue that HD is or has become active. The network service provider can benefit because a visual cue that HD is or has become active can be a way for the network service provider to tout the superior voice quality that is can offer. Accordingly, it would be desirable to provide a visual indication on a WCD display device when a call is or becomes an HD call, and when an HD call transitions to a non-HD call.

Hence, in one respect, various embodiments of the present invention provide a method implemented by a wireless communication device (WCD) operating in a wireless communication system that supports a multiplicity of modes of voice communication quality levels including a particular mode of high quality voice communication, the method comprising: receiving from a first base station of the wireless communication system a first message that includes a first specific indication confirming that the particular mode of high quality voice communication has become active on an end-to-end basis for an existing voice call between the WCD and a different WCD operating in the wireless communication system; and responsive to determining that the first message includes the first specific indication, displaying in a display of the WCD a particular icon signifying that the particular mode of high quality voice communication has become active.

In another respect, various embodiments of the present invention provide a wireless communication device (WCD) configured for operating in a wireless communication system that supports a multiplicity of modes of voice communication quality levels including a particular mode of high quality voice communication, the WCD comprising: one or more processors; a display device; memory accessible by the one or more processors; and machine-readable instructions stored in the memory, that upon execution by the one or more processors cause the WCD to carry out functions including: receiving from a first base station of the wireless communication system a first message that includes a first specific indication confirming that the particular mode of high quality voice communication has become active on an end-to-end basis for an existing voice call between the WCD and a different WCD operating in the wireless communication system, and responsive to determining that the first message includes the first specific indication, displaying in the display device a particular icon signifying that the particular mode of high quality voice communication has become active.

In still another respect, various embodiments of the present invention provide a non-transitory computer-readable medium having instructions stored thereon that, upon execution by one or more processors of a wireless communication device (WCD), cause the WCD to carry out functions including: operating in a wireless communication system that supports a multiplicity of modes of voice communication quality levels including a particular mode of high quality voice communication; receiving from a first base station of the wireless communication system a first message that includes a first specific indication confirming that the particular mode of high quality voice communication has become active on an end-to-end basis for an existing voice call between the WCD and a different WCD operating in the wireless communication system; and responsive to determining that the first message includes the first specific indication, displaying in a display of the WCD a particular icon signifying that the particular mode of high quality voice communication has become active.

These as well as other aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate the invention by way of example only and, as such, that numerous variations are possible. For instance, structural elements and process steps can be rearranged, combined, distributed, eliminated, or otherwise changed, while remaining within the scope of the invention as claimed.

DETAILED DESCRIPTION

Example embodiments will be described by way of example with reference to Code Division Multiple Access ("CDMA") communications in general, and to IS-856 and IS-2000 (including CDMA2000 1× and CDMA2000 1× Advanced) communications in particular. As described below, IS-2000 applies to both circuit-cellular and packet-data communications, and is referred to herein as "conventional" CDMA communications. For voice communications, CDMA2000 1× and/or CDMA2000 1× Advanced may specify codec support according to EVRC, including EVRC-B, EVRC-WB, and EVRC-NW. IS-856 applies more exclusively to packet-data communications (including, e.g., real-time voice and data applications), and is referred to herein as "high rate" packet-data communications. It should be understood that example embodiments can apply to other wireless voice and data protocols including, without limitation, IS-95, GSM, LTE, and LTE Advanced.

Figure 1:
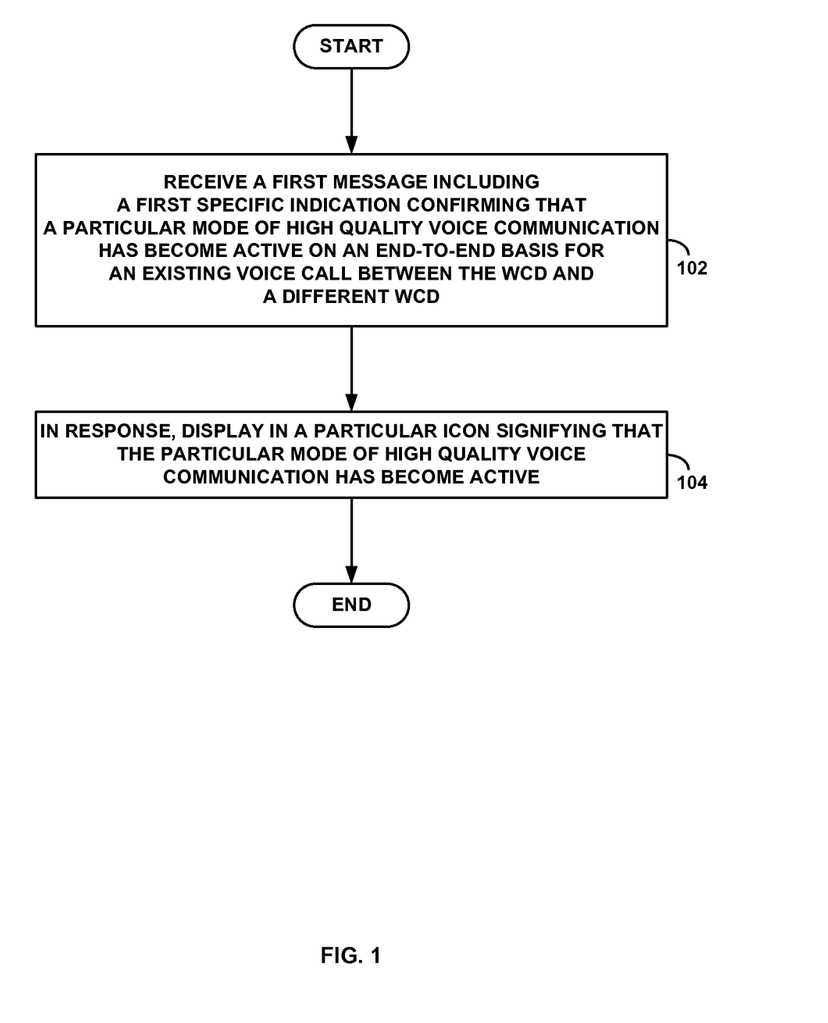
FIG. 1 is a flowchart of an example method of a customized banner display indicative of call quality, in accordance with example embodiments.

FIG. 1 is a flowchart illustrating an example method for a customized banner display indicative of call quality, in accordance example embodiments. By way of example, the method could be carried out by a RAN device configured to operate according to a CDMA family of protocols, including at least CDMA2000 1× Advanced. The RAN device could be, for example, a base station, a BTS, a BSC, or an MSC operating in a wireless communication system (or wireless communication network) that is also configured to operate according to a CDMA family of protocols.

The example method can be implemented as machine language instructions that, when executed by one or more processors of a WCD, cause the WCD to carry out the various functions, tasks, and operations of the method. Further, the machine language instructions could be stored, e.g. as compute code, on one or another form of non-transient computer readable media, such as magnetic disk, solid state memory, CD-ROM, and DVD, to name a few. The instructions (e.g., computer code) stored in the non-transient medium could be installed and/or transferred to a memory of the WCD, for example during an installation or manufacturing process.

At step 102, the WCD receives a first message that includes a first specific indication confirming that the particular mode of high quality voice communication has become active on an end-to-end basis for an existing voice call between the WCD and a different WCD. More particularly, the WCD and the different WCD can be operating in a wireless communication system that supports a multiplicity of modes of voice communication quality levels, including a particular mode of high quality voice communication. The first message can be received from a first base station of the wireless communication system.

At step 104, the WCD can respond to determining that the first message includes the first specific indication by displaying a particular icon signifying that the particular mode of high quality voice communication has become active. In particular, the WCD can display the particular icon in a display device of the WCD. The particular icon could take the form of a banner.

In accordance with example embodiments, the example method can also entail subsequently receiving from a second base station of the wireless communication system a second message that includes a second specific indication confirming that the particular mode of high quality voice communication is no longer active. Then, in response to determining that the second message includes the second specific indication, the WCD can remove the particular icon from its display.

In further accordance with example embodiments, the first base station and the second base station can be the same base station, or they could be different base stations. Further, receiving the second message from the second base station can entail receiving the second message within a context of a call management procedure that replaces the particular mode of high quality voice communication with a different one of the multiplicity of modes of voice communication quality levels. For example, operating conditions might change during the course of the voice call in such a way that the particular mode of high quality voice communication can no longer be supported. In this example, the second message can be an indication to transition to a lesser quality mode.

In accordance with example embodiments, receiving the first message can entail receiving the first message within a context of a call setup procedure that establishes a new call as the existing call. By way of example, a call setup procedure can establish a new call initially in a mode that provides a lesser quality of voice communication than the particular mode. This newly established call can be considered the existing call when the first message is received. But the first message can still be considered as being received in the context of the call setup procedure.

In accordance with example embodiments, receiving the first message can entail receiving the first message within a context of a call management procedure that replaces a different one of the multiplicity of modes of voice communication quality levels that is active for the existing call with the particular mode of high quality voice communication. For example, the existing call might be using lesser quality voice mode when operating conditions change during in such a way that the particular mode of high quality voice communication can now be supported. In this example, the first message can be an indication to transition to the particular mode, and can be considered to have been received during a call management procedure operating at the time that the operating conditions changed.

Also in accordance with example embodiments, the particular mode of high quality voice communication entail use of a particular codec that is configured for high fidelity, or HD, voice communications.

In further accordance with example embodiments, the wireless communication system can be configured to operate according to at least CDMA2000 1× Advanced, and the particular codec can be specified according to Enhanced Variable Bitrate Codec (EVRC) EVRC-NW. In this case, the first message can entail receiving a service option control message containing a service option parameter set to 73 and a capacity operating point parameter set to 0.

It will be appreciated that the example embodiment illustrated in FIG. 1 could include alternate and/or additional steps, while still remaining within the scope and spirit of example embodiments herein.

Figure 2:
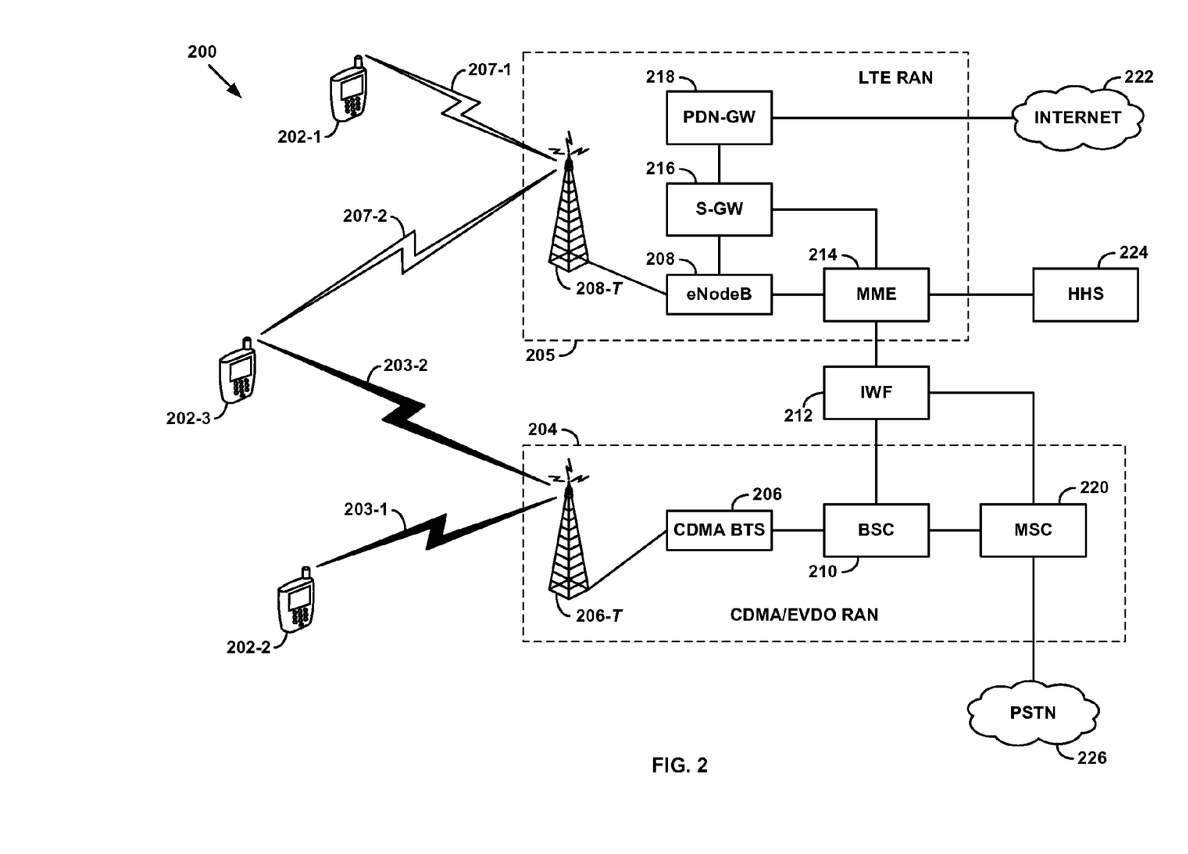
FIG. 2 is a block diagram of an example wireless communication system in which a customized banner display indicative of call quality could be implemented, in accordance with example embodiments.

FIG. 2 shows a simplified block diagram of a wireless network 200 that can be operated by a wireless service provider, and in which an example method of a customized banner display indicative of call quality can be carried out. By way of example, the network 200 includes RAN 204 configured to support both CDMA-based air interface communications (e.g., as specified under both IS-2000 and IS-856), RAN 205 configured to support OFDMA-based air interface communications (e.g., as specified under LTE Advanced). For convenience in discussing the example embodiments presented herein, the term "EVDO RAN" will be used for referring to the RAN 204, and the term "LTE RAN" will be used for referring to the RAN 205. It will be appreciated that a network such as network 200 could include support for other types of air-interface technologies as well.

The EVDO RAN 204 includes a CDMA BTS 206 with a CDMA/EVDO air interface antenna 206-T for providing services according to CDMA/EVDO. The LTE RAN 205 includes an LTE eNodeB 200 with an LTE air interface antenna 208-T for providing services according to LTE.

The example illustrated in FIG. 2 also shows three WCDs 202-1, 202-2, and 202-3, each depicted as having at least one active air interface of a particular type with one or another of the antennas 206-T or 208-T. Specifically, the WCD 202-1 has an air interface 201-1 with the LTE RAN 205 via the eNodeB 208 and the associated antenna 208-T. The WCD 202-2 has an air interface 203-1 also with the EVDO RAN 204 via the BTS 206 and the associated antenna 206-T. The WCD 202-2 has two different air interfaces: an air interface 203-2 with the EVDO RAN 204 via the BTS 206 and the associated antenna 206-T, and an air interface 207-2 with the LTE RAN 205 via the eNodeB 208 and the associated antenna 208-T.

As a visual cue of that the air interfaces are different types, the LTE air interfaces are depicted as white-filled "lightning bolts," and the EVDO air interfaces are depicted as blackened "lightning bolts." The two air interfaces 207-2 and 203-2 depicted for the WCD 202-3 may be taken as representing a capability of the WCD 202-3 to operate according to either air interface separately, and/or to operate according to both concurrently.

For communications under LTE (or LTE Advanced) based protocols, subscribers may engage in communications via the eNodeB 208 and the associated antenna 208-T from the WCD 202-1 over air interface 207-1 and/or from the WCD 202-3 over air interface 207-2. Transmissions over the air interface 207-1 from the antenna 208-T to the WCD 202-1 represent a downlink from the eNodeB 208 to the WCD 202-1, while transmissions over air interface 207-1 from the WCD 202-1 to the antenna 208-T represent an uplink from the WCD 202-1. Similarly, transmissions over the air interface 207-2 from the antenna 208-T to the WCD 202-3 represent a downlink from the eNodeB 208 to the WCD 202-3, while transmissions over air interface 207-2 from the WCD 202-3 to the antenna 208-T represent an uplink from the WCD 202-3. Under LTE Advanced, the downlink operates according to OFDMA, while the uplink operates according to Single Carrier Frequency Division Multiple Access (SC-FDMA).

The eNodeB 208 may be connected to a serving gateway S-GW 216, which in turn may be connected to an internet 222 via a packet data network gateway PDN-GW 218. The eNodeB 208 could also be connected to the S-GW 216 by way of a mobility management entity MME 214, which may also be configured to control communications between the eNodeB 208 and one or more other eNodeBs in the network. The MME 214 may also be communicatively coupled to a home subscriber server (HSS) 224, which stores subscriber information, including information about the WCD 202-1 and/or WCD 202-3. For cellular voice communications, the eNodeB may connect to a MSC 220 by way of an inter-working function IWF 212 communicatively connected between the MME 212 and the MSC 220. The MSC 220 may then provide connectivity of a PSTN 226, as shown.

For communications under CDMA based protocols, subscribers may engage in communications via the BTS 206 and the associated antenna 206-T from the WCD 202-2 over air interface 203-1 and/or from the WCD 202-3 over air interface 203-2. Transmissions over the air interface 203-1 from the antenna 206-T to the WCD 202-2 represent a forward link from the CDMA/EVDO BTS 206 to the WCD 202-2, while transmissions over air interface 203-1 from the WCD 202-2 to the antenna 206-T represent a reverse link from the WCD 202-2. Similarly, transmissions over the air interface 203-2 from the antenna 206-T to the WCD 202-3 represent a forward link, while transmissions over air interface 203-2 from the WCD 202-3 to the 206-T represent a reverse link.

The CDMA BTS 206 may be connected to a BSC 210, which provides a connection to the MSC 220 for cellular voice communications. The MSC 220 acts to control assignment of air traffic channels (e.g., over air interfaces 203-1 and 203-2), and provides access to wireless circuit-switched services such as circuit-voice and circuit-data (e.g., modem-based packet data) service. As represented by its connection to the PSTN 226, the MSC 220 may also be coupled with one or more other MSCs, other telephony circuit switches in the operator's (or in a different operator's) network, or other wireless communication systems, thereby supporting user mobility across MSC regions, roaming between systems, and local and long-distance landline telephone services.

For packet data communications, the IWF 212 connected between the BSC 210 and the MME 214 can support interworking between EVDO based packet protocols and those of the LTE Advanced based network. Thus, the BSC 210 may communicate on the internet 222 by way of the MME 214, the S-GW 216, and the PDN GW 218.

It should be understood that the depiction of just one or two of each network element in FIG. 2 is illustrative, and there could be more of any of them, as well as other types of elements not shown. The particular arrangements shown in FIG. 2 should not be viewed as limiting with respect to the example embodiments presented herein. Further, the network components that make up a wireless communication system such as network 200 are typically implemented as a combination of one or more integrated and/or distributed platforms, each comprising one or more computer processors, one or more forms of computer-readable storage (e.g., disks drives, random access memory, etc.), one or more communication interfaces for interconnection between elements and the network and operable to transmit and receive the communications and messages described herein, and one or more computer software programs (or other forms of computer logic instructions) and related data (e.g., machine-language instructions and program and user data) stored in the one or more forms of computer-readable storage and executable by the one or more computer processors to carry out the functions, steps, and procedures of the various example embodiments described herein. Similarly, a communication device, such as example WCDs 202-1, 202-2, and 202-3, typically comprises a user-interface, I/O components, a communication interface, a tone detector, a processing unit, and data storage, all of which may be coupled together by a system bus or other mechanism. As such, network 200, WCDs 202-1, 202-2, and 202-3, and air interfaces 203-1, 203-2, and 207-1, and 207-2 collectively are representative of example means of implementing and carrying out the various functions, steps, and procedures described herein.

Figure 3:
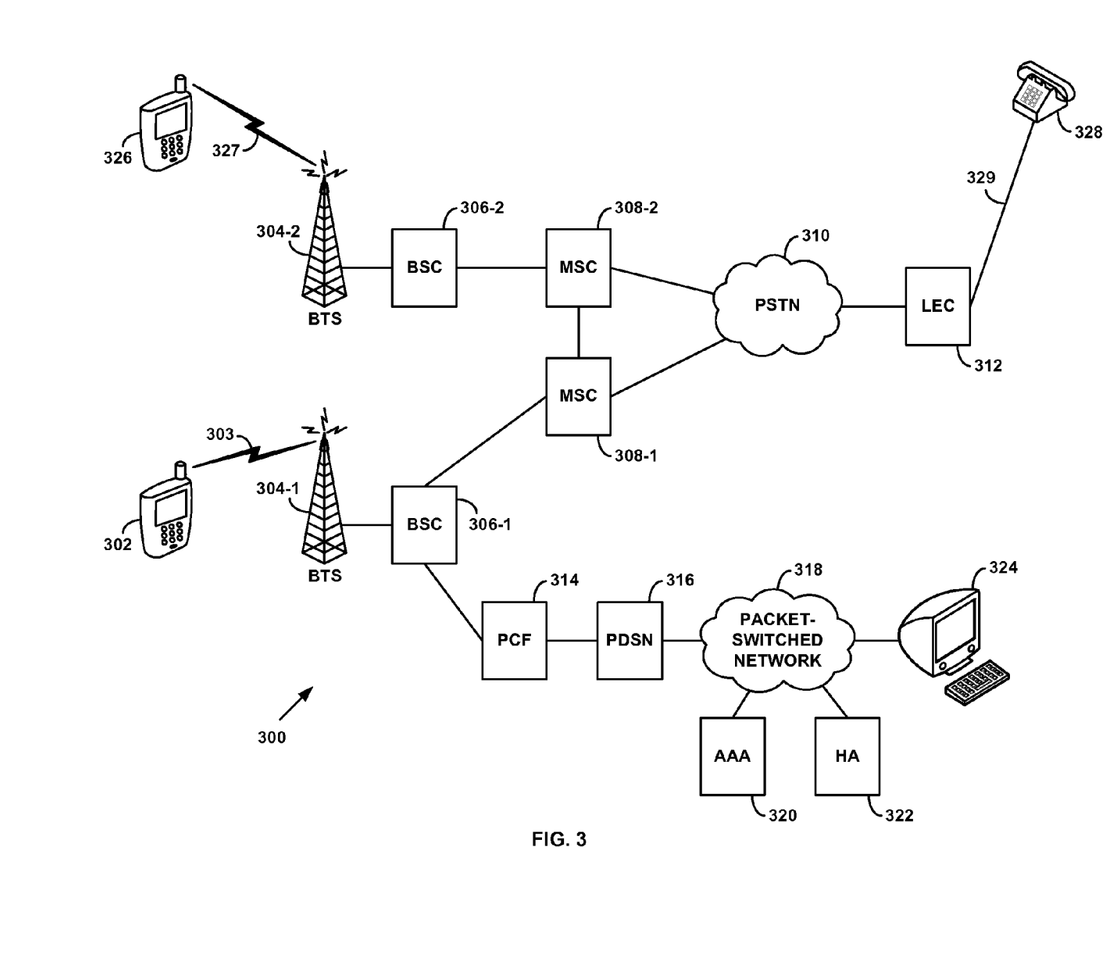
FIG. 3 is an alternative form of a block diagram of an example wireless communication system in which a customized banner display indicative of call quality could be implemented, in accordance with example embodiments.

FIG. 3 shows an alternative form block diagram of a wireless communication system 300 depicting, by way of example, aspects specific to CDMA. A WCD 302 communicates over an air interface 303 with a BTS 304-1, which is then coupled or integrated with a BSC 306-1. Transmissions over air interface 303 from BTS 304-1 to AT 302 represent the forward link to the WCD, and transmissions over interface 303 from the WCD 302 to BTS 304-1 represent the reverse link.

The BSC 306-1 is connected to MSC 308-1, which acts to control assignment of air traffic channels (e.g., over air interface 303), and provides access to wireless circuit-switched services such as circuit-voice and circuit-data (e.g., modem-based packet data) service. By way of example, the MSC 308-1 is shown as being connected to a second MSC region represented in the figure by the MSC 308-2, the BSC 306-2, and the BTS 304-2. Support for user mobility across MSC regions, as well as communications between WCDs in different MSC regions, is represented by the connection shown between the MSC 308-1 and 308-2. As represented by their respective connections to PSTN 310, MSCs 308-1 and 308-2 are also coupled with one or more telephony circuit switches, such as the Local Exchange Carrier (LEC) switch 312 in the operator's (or in a different operator's) network. The LEC 312 (or other form of landline switch) may support connectivity to landline subscribers, such as is represented by landline phone 328 connected via the end link 329.

As shown, BSC 306-1 is also connected with a PDSN 316 by way of packet control function (PCF) 314. PDSN 316 in turn provides connectivity with a packet-switched network 318, such as the Internet and/or a wireless carrier's private core packet-network. Sitting as nodes on network 318 are, by way of example, an authentication, authorization, and accounting (AAA) server 320, a mobile-IP home agent (HA) 322, and a remote computer 324. After acquiring an air traffic channel over its air interface, a WCD (e.g., WCD 302) may send a request to PDSN 316 for a connection in the packet data network. Then, following authentication of the WCD by AAA server 320, the access terminal may be assigned an IP address by the PDSN or by HA 322, and may thereafter engage in packet-data communications with entities such as remote computer 324. Although not necessarily shown explicitly in FIG. 3, the BSC 308-2 may also provide a packet data connection to a packet switch network, such the network 318, for packet-data services.

It should be understood that the depiction of just one (or two) of each network element in FIG. 3 is illustrative, and there could be more than one (or two) of any of them, as well as other types of elements not shown. The particular arrangement shown in FIG. 3 should not be viewed as limiting with respect to the embodiments herein. Further, the network components that make up a wireless communication system such as system 300 are typically implemented as a combination of one or more integrated and/or distributed platforms, each comprising one or more computer processors, one or more forms of computer-readable storage (e.g., disks drives, random access memory, etc.), one or more communication interfaces for interconnection between elements and the network and operable to transmit and receive the communications and messages described herein, and one or more computer software programs and related data (e.g., machine-language instructions and program and user data) stored in the one or more forms of computer-readable storage and executable by the one or more computer processors to carry out the functions, steps, and procedures of the various embodiments of the present invention described herein. Similarly, a communication device such as the example WCD 302 typically comprises a user-interface, I/O components, a transceiver, a communication interface, a tone detector, a processing unit, and data storage, all of which may be coupled together by a system bus or other mechanism. As such, system 300, WCDs 302 and 326, air interfaces 303 and 327, landline phone 328, and end link 329 are representative of exemplary means of implementing and carrying out the various functions, steps, and procedures described herein.

1. EXAMPLE ACCESS TECHNOLOGIES a. CDMA Communications

In a conventional CDMA wireless network compliant with the well-known IS-2000 standard, each cell employs one or more carrier frequencies, typically 1.25 MHz in bandwidth each, and each sector is distinguished from adjacent sectors by a pseudo-random number offset ("PN offset"). Further, each sector can concurrently communicate on multiple different channels, distinguished by "Walsh codes." In doing so, each channel is allocated a fraction of the total power available in the sector. When a WCD operates in a given sector, communications between the WCD and the BTS of the sector are carried on a given frequency and are encoded by the sector's PN offset and a given Walsh code. The power allocated to each channel is determined so as to optimize the signal to noise characteristics of all the channels, and may vary with time according to the number of WCDs being serviced, and their relative positions with respect to the BTS, among other factors.

Air interface communications are divided into forward link communications, which are those passing from the base station to the WCD, and reverse link communications, which are those passing from the WCD to the base station. In an IS-2000 system, both the forward link and reverse link communications in a given sector are encoded by the sector's PN offset and a given Walsh code. On the forward link, certain Walsh codes are reserved for use to define control channels, including a pilot channel, a sync channel, and one or more paging channels (depending on service demand, for example), and the remainder can be assigned dynamically for use as traffic channels, i.e., to carry user communications. Similarly, on the reverse link, one or more Walsh codes may be reserved for use to define access channels, and the remainder can be assigned dynamically for use as traffic channels.

In order to facilitate efficient and reliable handoff of WCDs between sectors, under IS-2000 a WCD can communicate on a given carrier frequency with a number of "active" sectors concurrently, which collectively make up the WCD's "active set." Depending on the system, the number of active sectors can be up to six (currently). The WCD receives largely the same signal from each of its active sectors and, on a frame-by-frame basis, selects the best signal to use. A WCD's active set is maintained in the WCD's memory, each active sector being identified according to its PN offset.

The WCD continually monitors a pilot signal from each of its active sectors as well as from sectors in a "neighbor list" of other sectors generally neighboring the active sectors. The pilot signal strengths may vary as the WCD moves about within the wireless communication system, or as other factors cause the WCD's RF conditions to change. More particularly, the WCD monitors a signal-to-noise metric referred to as "signal to interference plus noise ratio" ("SINR"), which includes the degrading effects of interference as well as noise on RF conditions. The WCD reports the received signal strengths to the serving base station, which then directs the WCD to update its active set from among its current active set and, more broadly, from among its neighbor list, in accordance with the reported strengths and one or more threshold conditions.

Typically, the power level of the pilot detected by a WCD is specified as a gain level, x, according to the relation x dBm=10 $\log_{10}$ (P/1 mW), where P is the power in mW (milliwatts). However, other power units could be specified. Measured in dBm, gain expresses a logarithmic ratio of power P to a fixed power level of 1 mW. More generally, the relative gain, y, of one power level $P_1$ to another $P_2$ is expressed as dB, and corresponds to a logarithmic ratio of $P_1$ to $P_2$ given by y dB=10 $\log_{10}$ ($P_1/P_2$). For instance, if y=3, then $P_1 \approx 2 \times P_2$; if y=−3, then $P_1 \approx 0.5 \times P_2$. In practice, SINR is measured in dB, where $P_1$ corresponds to the received power of the pilot and $P_2$ corresponds to the received noise plus interference power.

In order to support concurrent communication in multiple channels on a common frequency, each channel is allocated a fraction of the total forward-link power available in the sector. The power allocated to each channel is determined so as to optimize the signal-to-noise characteristics of all the channels, and may vary with time according to the number of access terminals being serviced, and their relative positions with respect to the BTS, among other factors. Similarly, on the reverse links, each access terminal transmits at a power level that optimizes the signal-to-noise while minimizing interference with other access terminals.

With arrangement described above, an access terminal can engage in cellular voice or packet-data communications. Referring again to FIG. 3, and taking an originating call from WCD 302 as an example, WCD 302 first sends an origination request over air interface 303 and via the BTS 304-1 and BSC 306-1 to MSC 308-1. The MSC then signals back to the BSC directing the BSC to assign an air interface traffic channel for use by the access terminal. For a voice call, the MSC uses well-known circuit protocols to signal call setup and establish a circuit connection to a destination switch that can then connect the call to a called device (e.g., landline phone or another access terminal).

For a packet-data session, the BSC 306-1 signals to the PDSN 316 by way of PCF 314. The PDSN 316 and the WCD 302 then negotiate to establish a data link layer connection, such as a point to point protocol (PPP) session. Further, the PDSN 316 sends a foreign agent advertisement that includes a challenge value to the WCD, and the access terminal responds with a mobile-IP registration request (MIP RRQ), including a response to the challenge, which the PDSN forwards to HA 322. The HA then assigns an IP address for the WCD to use, and the PDSN passes that IP address via the BSC to the access terminal.

b. High Rate Packet-Data TDM Communications

Under IS-2000, the highest rate of packet-data communications theoretically available on a fundamental traffic channel of the forward link is 9.6 kbps, dependent in part on the power allocated to the forward-link traffic channel and the resultant signal to noise characteristics. In order to provide higher rate packet-data service to support higher bandwidth applications, the industry introduced a new "high rate packet data (HRPD) system," which is defined by industry standard IS-856 (or EVDO).

IS-856 leverages the asymmetric characteristics of most IP traffic, in which the forward link typically carries a higher load than the reverse link. Under IS-856, each WCD maintains and manages an active set and a neighbor list as described above, but receives forward-link transmission from only one active sector at a time. In turn, each sector transmits to all its active WCDs on a common forward link using time division multiplexing (TDM), in order to transmit to only one WCD at a time, but at the full power of the sector. As a result of the full-power allocation by the sector, a WCD operating under IS-856 can, in theory, receive packet-data at a rate of at least 38.4 kbps and up to 2.4 Mbps. The reverse link under IS-856 retains largely the traditional IS-2000 code division multiplexing (CDM) format, albeit with the addition of a data rate control (DRC) channel used by the WCD to indicate the supportable data rate and best serving sector for the forward link. More specifically, the WCD monitors SINR on the forward link from its serving sector (or base station) to determine a data rate to request. The requested data rate is encoded in a DRC request, and transmitted to the serving base station on the DRC channel, which is a sub-channel of a reverse-link Medium Access Control (MAC) channel.

TDM access on the IS-856 forward link is achieved by dividing the forward link in the time domain into time slots of length 2048 chips each. At a chip rate of 1.228 Megachips per second, each slot has a duration of 1.67 milliseconds (ms). Each time slot is further divided into two 1024-chip half-slots, each half-slot arranged to carry a 96-chip pilot "burst" (pilot channel) at its center and a forward-link MAC channel in two 64-chip segments, one on each side of the pilot burst. The remaining 1600 chips of each time slot (800 per half-slot) are allocated for a forward traffic channel or a forward control channel, so that any given time slot will carry either traffic-channel data (if any exists) or control-channel data. As in IS-2000, each sector in IS-856 is defined by a PN offset, and the pilot channel carries an indication of the sector's PN offset.

Operation in an IS-856 compliant communication system may be illustrated, again with reference to FIG. 3. To acquire packet data connectivity under IS-856, after the WCD 302 first detects an IS-856 carrier, the WCD 302 sends to its BSC (or RNC) 306-1 a UATI (Universal Access Terminal Identifier) request, and receives in response an UATI, which the WCD can then use to identify itself in subsequent communications with the BSC. The WCD then sends a connection-request to the BSC 306-1, and the BSC responsively invokes a process to authenticate the WCD and to have the WCD acquire a data link.

In particular, the BSC 306-1 sends an access request to an Access Network AAA (ANAAA) server (which may be different than the AAA server 320), and the ANAAA server authenticates the WCD. The BSC 306-1 then assigns radio resources for the data session, providing a MAC identifier ("MAC ID") to the WCD for identifying its time-slot data sent in the forward-link traffic channel, and a Walsh code for a sending data on the reverse-link traffic channel. Further, the BSC 306-1 signals to the PDSN 316 (via PCF 314), and the PDSN and WCD then negotiate to establish a PPP data link. In addition, as in the IS-2000 process, the WCD then sends an MIP RRQ to the PDSN, which the PDSN forwards to the HA 322, and the HA assigns a mobile-IP address for the WCD to use.

Once the WCD has acquired an IS-856 radio link, a data link, and an IP address, the WCD is considered to be in an active mode. In active mode, the WCD receives its data distributed across MAC-identified time slots transmitted by the BTS using the full power of the forward link of the sector selected by the WCD (as described above). Thus, the WCD recognizes its time-slot data from among other time slots by a MAC identifier included in each transmission, and processes only those time slots with the WCD's assigned MAC identifier. Using the full power of the forward link maximizes the signal-to-noise ratio, thus facilitating higher rate data communication than the power-limited conventional CDMA channels.

c. LTE Advanced Communications

Under LTE Advanced, the air interface comprises multiple frequency carrier bands arranged to cover a total bandwidth in frequency space that depends on what portion or portions of the radio spectrum are licensed by the network service provider, and on which of two types of systems is deployed, which in turn may also depend on the licensed spectrum. In frequency division duplex (FDD) LTE, the uplink and down link each occupy a different block of radio spectrum, each block providing up to 20 MHz of bandwidth in frequency space. Under FDD LTE, uplink and downlink transmissions can be concurrent. In time division duplex (TDD) LTE, the uplink and downlink each occupy the same block of radio spectrum. Under TDD LTE, uplink and downlink transmissions take turns according to configuration-specific allocation of subframes within repeating radio transmission frames.

For both FDD and TDD LTE, each frequency carrier band is divided into 12 orthogonal subcarrier frequencies, each 15 kHz in width, for a total of 180 kHz per frequency carrier band. The number of frequency carrier bands corresponds to the integer division of the total bandwidth by 180 kHz. For example, a total bandwidth of 1.25 MHz supports six frequency carrier bands; a total bandwidth of 20 MHz supports 100 frequency carrier bands. The orthogonality of the subcarrier frequencies follows from each being an integer multiple of the same minimum frequency; e.g., 15 kHz. It will be appreciated that a different minimum frequency could be used, as long as the orthogonality condition is met. Similarly, a different number of subcarrier frequencies per frequency carrier band could be used, which could then lead to a different number frequency carrier bands for a given total bandwidth.

In the time domain, both the uplink and downlink comprise time slots, each time slot typically of 0.5 msec duration. Every two time slots makes up one "subframe" of 1.0 msec duration, and every 10 subframes makes up a 10 msec frame. In FDD LTE, each subframe of a frame carries only uplink or only downlink transmission. In TDD LTE, each frame includes both uplink and downlink subframes, the relative number of and placement of each type of subframe typically being specified by defined standards and/or a system-specific configuration.

Each time slot is subdivided into an integer number of symbol durations, such that the integer number multiplied by the symbol duration equals 0.5 msec. According to current standards, the integer number is either 6 or 7; the value used depends on operating conditions, among other possible factors. For the purposes of the present discussion the integer number of symbol durations per time slot will be taken to be 7, with the understanding that other values could be used.

Transmissions are scheduled in time-frequency units referred to as "resource blocks" or RBs. Each RB is made up of 7 contiguous symbol durations (i.e., one time slot) and 12 subcarrier frequencies of a given frequency carrier band. Thus, a RB can be viewed a grid of 7 symbol durations by 12 subcarrier frequencies. Each element of the grid is referred to as "resource element," and each resource element carries one OFDM symbol. Each OFDM symbol of a resource element is a time domain symbol generated from Fourier superposition frequency domain symbols. On given uplink or downlink, concurrent transmissions carried in different RBs are non-interfering in the sense that the subcarrier frequencies are orthogonal. Thus, while a receiving device (e.g., a UE on a downlink or an eNodeB on an uplink) will receive a superposition signal, the orthogonality property allows recovery by Fourier decomposition of the symbols in the frequency domain.

A single RB is the smallest unit of allocation made for a given WCD for downlink transmissions. Allocations are typically made by an eNodeB serving the WCD, and more than one RB can be allocated for the WCD. Multiple RB allocations for a given WCD can be made across multiple frequency carrier bands, across multiple time slots, or both, depending on factors including the amount of data to be transmitted to the WCD, the type of data (e.g., best-effort, real-time, etc.), and downlink resources needed for other WCDs.

In addition to carrying OFDM symbols specific to a given WCD, particular resource elements of a given RB are allocated as "reference signals," and may be used to carry pilot signals from the eNodeB. Upon detection of a pilot signal in one or more resource elements of an RB, a WCD may determine SINR of the eNodeB (or more generally, the LTE Advanced base station) that made the RB-based transmission. The WCD may then use the SINR (or other SNR measure) of different eNodeBs that it detects to determine if and when to hand off from one to another, for example. Specific RBs of the downlink can also be configured as channels for carrying system messages and/or other overhead data. In addition, specific RBs of the uplink can be configured to support a random access procedure by which WCDs can request network access on a random basis. This is discussed in more detail below.

Under LTE, the network provides the WCD with neighbor lists that identifies neighboring eNodeBs that may be suitable candidates for service for the WCD. The WCD can measure signal quality of those eNodeBs in the neighbor list that it can detect, and report the measurements back to the network. The network can then decide if a handover (as handoff is referred to under LTE) is warranted.

2. CUSTOMIZING A BANNER DISPLAY INDICATIVE OF CALL QUALITY

When a communication session, such as a voice call, is set up with a WCD operating in a wireless communication system, a forward link from the base station to the WCD, and a reverse link from the WCD to the base station, is established on an air interface between the WCD and the base station. For a voice call, in particular, a voice codec—or more generally, a media codec—can be selected by the base station (or other RAN element) for each of the forward link and the reverse link. In addition, setup of a voice call between two WCDs can entail "negotiation" between the two in order to determine (e.g., select) an appropriate codec for end-to-end communications.

Media codecs may be either lossless or lossy. Lossless media codecs may use an encoding format that allows the encoded media to be decoded back to its original format. Thus, lossless media codecs may support high quality transmission and storage of media.

On the other hand, some media codecs are lossy. Lossy codecs are typically used on media for which some degree of degradation is acceptable. For instance, compact disc audio can be compressed to about 10-20% of its size (i.e., achieving about 80-90% compression) by using an MP3 codec to discard the audio components that are beyond the auditory resolution ability of most individuals. Thus, to most listeners, music encoded in the MP3 format sounds about the same as it would if played directly from the compact disc. Similarly, voice codecs may take advantage of psychoacoustics to remove redundant or less audible components of voice signals, resulting in about 80-90% compression of the voice signal.

In practice, different lossy codecs may support different extents of lossy compression (e.g., some codecs will support compression with more loss than other codecs). Some lossy codecs may support multiple extents of lossy compression (e.g., a particular codec may select between two or more rates of lossy compression).

In general, there may be a roughly linear relationship between media codec bitrate and the media quality that the media codec produces at that bitrate. For example, a voice codec operating at 9.6 kilobits per second is likely to produce better quality voice than a voice codec operating at 4.8 kilobits per second. However, as media codec technologies advance, new media codecs may be introduced that are capable of supporting equal or better media quality at a lower bitrate. Thus, in some cases, a voice codec that operates at 8.5 kilobits per second may produce better voice quality than the voice codec operating at 9.6 kilobits per second. Furthermore, some voice codecs are capable of supporting multiple different encoding rates, and perhaps even switching between these rates dynamically to adapt to the characteristics of the input signal and/or to achieve a target bitrate.

Codecs typically comply with one or another industry standard in order to help insure interoperability. For example, CDMA 2000 Spread Spectrum Systems (also referred to as CDMA2000 1x) and CDMA 2000 Spread Spectrum Systems Revision E (also referred to as CDMA2000 1x Advanced) specify support for a family of codecs referred to under the umbrella of "Enhanced Variable Bitrate Codec," or "EVRC."

By way of example, the EVRC-A codec operates on input speech signals sampled with 16-bit resolution 8,000 times per second (e.g., 8,000 Hz). The resulting 128 kilobit per second stream is divided into 20 millisecond frames, each of which is compressed to either 171 bits (8.55 kilobit per second), 80 bits (4.0 kilobits per second), or 16 bits (0.8 kilobits per second).

The EVRC-B codec also operates on input speech signals sampled with 16-bit resolution 8,000 times per second, and supports the three compressed bitrates supported by EVRC-A. However, EVRC-B also supports a compressed frame size of 40 bits (2.0 kilobits per second). Further, EVRC-B defines eight levels of average data rates that may be selected for encoding on a forward link to, and/or a reverse link from. Generally, a higher the data rate requires higher transmission power, but provides the better the voice quality, and vice versa. The eight levels are referred to as "capacity operating points" or "COPs," and are labeled with parameter values 0 through 7, in order from highest to lowest average data rate. When a given call is set up, the RAN (or RAN element, such as a BSC) selects a COP value based on capacity utilization of the sector in which the WCD is operating. The COP value may also be adjusted by the RAN as the WCD moves between sectors that have differing capacity loading conditions.

Table 1 lists the COP parameters values (first column) and corresponding channel encoding rates (second column), source encoding rates (third column), and average data rates (fourth column) for EVRC-B. The average data rates include bits for silence intervals.

TABLE 1

| COP | Channel Rate (kbps) | Source Rate (kbps) | Average Rate (kbps) |
| --- | --- | --- | --- |
| 0 | 9.3 | 8.3 | 6.93 |
| 1 | 8.5 | 7.57 | 6.42 |
| 2 | 7.5 | 6.64 | 5.52 |
| 3 | 7.0 | 6.18 | 5.24 |
| 4 | 6.6 | 5.82 | 4.82 |
| 5 | 6.2 | 5.45 | 4.62 |
| 6 | 5.8 | 5.08 | 4.45 |
| 7 | 4.8 | 4.0 | 3.75 |

As can be seen, lower COP values correspond to higher data rates, and vice versa. Generally, COPs 0-3 specify encoding rates that yield the highest voice quality, but requires the highest transmission powers. COP 4 specifies encoding rate that yield voice quality comparable to EVRC, but requires slightly lower transmission power than EVRC, while COPs 5-7 specify encoding rates that yield the lower voice quality than EVRC, but requires even lower transmission powers.

The EVRC-WB codec is a "wideband" variation of EVRC-B. Particularly, EVRC-WB operates on input speech signals sampled with 16-bit resolution at 8,000 or 16,000 times per second. When sampling at the rate of 8,000 times per second, frames encoded with EVRC-WB can be compatible with EVRC-B encodings. When sampling at 16,000 times per second, frames encoded with EVRC-WB are 171 bits (8.55 kilobit per second). However, unlike the 171 bit frames produced when sampling at 8,000 times per second, the EVRC-WB frames include high-frequency components from the 3.5 kHz to 7 kHz range. Thus, at the same bitrate, EVRC-WB may be capable of producing higher quality voice calls than EVRC-A or EVRC-B. Because of the ability to support higher voice quality with EVRC-WB, it can be used for high fidelity voice calls—i.e., HD voice. In addition to its own target bitrates, EVRC-WB supports two of the operating points of EVRC-B. EVRC-WB also supports a mode for improved encoding of non-speech signals, such as music-on-hold.

The EVRC-NW codec supports at least some of the encodings of both EVRC-B and EVRC-WB, and, like EVRD-WB, can be used for HD voice calls. Particularly, EVRC-NW supports the sampling frequencies and frame sizes of EVRC-WB. Also, EVRC-WB supports seven of the operating points (and associated target bitrates) of EVRC-B, and also supports the mode for improved encoding of non-speech signals. Thus, EVRC-NW is fully compatible with EVRC-WB, and supports more operating modes of EVRC-B than EVRC-WB.

Each of the different EVRC options can be selected by including a specific CDMA "service option" ("SO") one or more types of call setup/management messages. For example, EVRC-A can be selected according SO 3; EVRC-B can be selected according to SO 68; EVRC-WB can be selected according to SO 70, and EVRC-NW selected according to SO 73. In order to establish an HD voice call between two WCDs, for example, EVRC-NW needs to be support by both WCDs. During initial call setup, SO 73 can be specified. Then, if operating conditions allow, COP 0—the highest quality available—can be chosen. With SO 73 and COP 0, the call can be an HD call.

Figure 4:
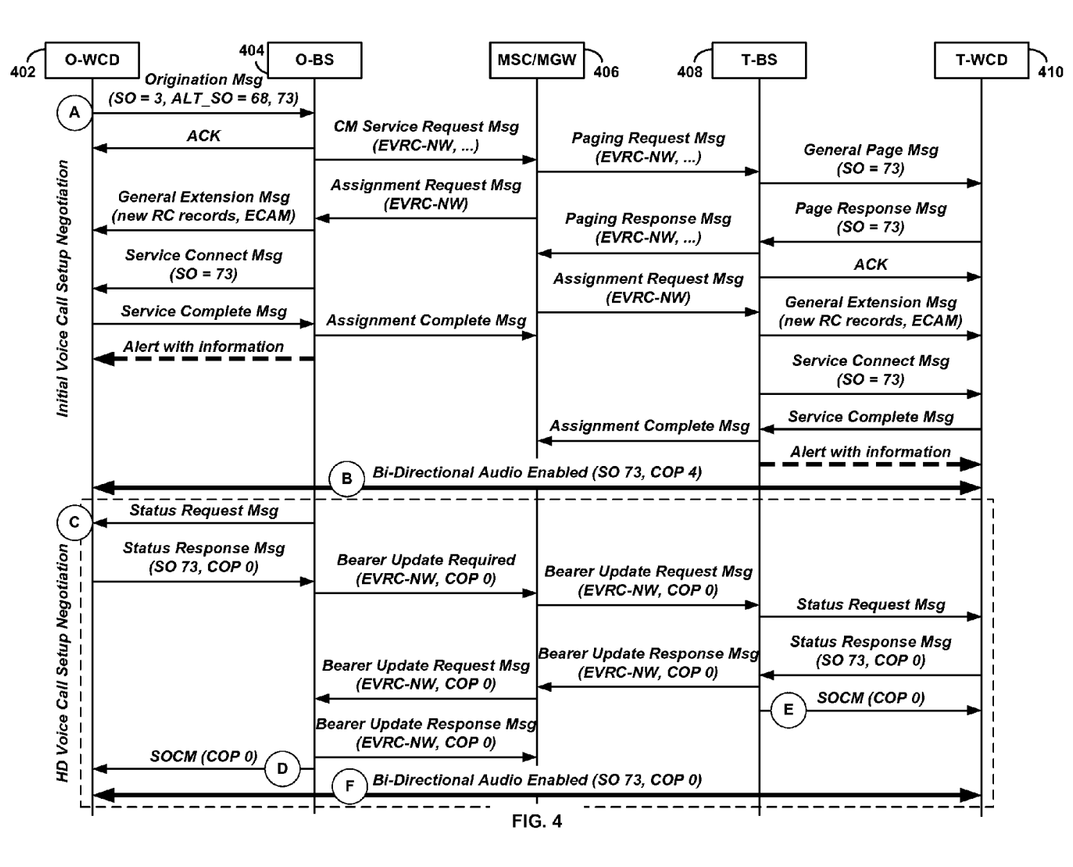
FIG. 4 is an example call flow illustrating call setup, in accordance with example embodiments.

FIG. 4 is a call flow illustrating an example call setup, in accordance with example embodiments. By way of example, an originating WCD (labeled "O-WCD") 402 is shown as placing a call to a terminating WCD (labeled "T-WCD") 410. Network elements involved the message flow include an originating base station (labeled "T-BS") 404, an MSC/MGW (media gateway) 406, and a terminating base station (labeled "T-BS") 408. For purposes of discussion, a number of aspects of the call setup are labeled with a circled letter. However, not every message in the call flow is necessarily identified in this manner.

Step A signifies the start of a first phase of call setup that begins with a new call request and continues until a bi-directional, narrow bandwidth call is establish. As shown by way of example, the O-WCD 402 requests the new call by sending an origination message to the O-BS 404 indicating SO 3 (EVRC-A) and alternate service options SO 68 and 73 (EVRC-B and EVRC-NW).

The O-BS 404 then sends a connection management service request message to the MSC/MGW 406, which the sends a paging request message to the terminating T-BS 408. Both messages indicate the EVRC-NW codec, as shown.

On the originating side of the call, the MSC/MGW 406 then responds to the connection management service request message by sending an assignment request message confirming the EVRC-NW codec to the O-BS 404. The O-BS 404 next sends a general extension message to the O-WCD 402 with a channel assignment, and then a service connect message with SO 73 indicating the EVRC-NW codec. The O-WCD 402 responds with a service complete message, and the O-BS 404 confirms the channel assignment by sending an assignment complete message to the MSC/MGW 406. At this point, an air interface channel between the O-WCD 402 and the O-BS 404 has been established for the call.

Continuing on the terminating side of the call, the T-BS 408 sends a general page message with SO 73 to the T-WCD 410, to which the T-WCD 410 responds with a page response message. The T-BS 408 then responds to the MSC/MGW 406 with a paging response message, and to the T-WCD 410 with an acknowledgement. The MSC/MGW 406 then responds to the paging response message by sending an assignment request message confirming the EVRC-NW codec to the T-BS 408. The T-BS 408 next sends a general extension message to the T-WCD 410 with a channel assignment, and then a service connect message with SO 73 indicating the EVRC-NW codec. The T-WCD 410 responds with a service complete message, and the T-BS 408 confirms the channel assignment by sending an assignment complete message to the MSC/MGW 406. At this point, an air interface channel between the T-WCD 410 and the T-BS 408 has been established for the call. Once the air interface channel between the O-WCD 402 and the O-BS 404 has been established, the O-BS 404 sends an alerting signal to the O-WCD 402.

As indicated at step B, a bi-directional audio connection between the O-WCD 402 and the T-WCD 410 has now been established. The codec for the call is EVRC-NW (SO 73) with COP 4, as shown. That is, the call has been set up with an HD-capable codec, but not with the HD mode selected (e.g., COP 0). The selection of COP 4 can be considered a possible default for the initial voice call setup.

Step C begins a phase of end-to-end negotiation between the O-WCD 402 and the T-WCD 410 in order to establish an HD call. More specifically, the O-WCD 402 can respond to a status request message from the O-BS 404 with a status response message that include SO 73 (EVRC-NW) and COP 0 (for an HD call). The O-BS 404 then sends a bearer update required message with EVRC-NW and COP 0 to the MSC/MGW 406, and the MSG/MGW 406 responsively sends a bearer update request the message with EVRC-NW and COP 0 to the T-BS 408. The T-BS 408 then sends a status request message to the T-WCD 410, which responds with a status response message that includes SO 73 (EVRC-NW) and COP 0 (for an HD call). In response, the T-BS 408 next sends a bearer update response message with EVRC-NW and COP 0 to the MSC/MGW 406.

Upon receiving the bearer update response message from the T-BS 408, the MSC/MGW 406 sends a bearer update request the message with EVRC-NW and COP 0 to the O-BS 404. The O-BS 404 responds by sending a bearer update response message with EVRC-NW and COP 0 to the MSC/MGW 406, and, at step D, by sending a service option control (SOCM) message with COP 0 to the O-WCD 402.

Upon sending the bearer update response message on the terminating side, the T-BS 408, at step E, sends a service option control (SOCM) message with COP 0 to the T-WCD 410. As indicated at step F, a bi-directional audio connection between the O-WCD 402 and the T-WCD 410 with SO 73 and COP 0 is now established. That is, an HD call is now set up between the two WCDs.

As a call progresses in time, operating conditions of one or both of the WCDs in the call may vary. In particular, during a call that is initially set up as HD, such as the call illustrated in the call flow of FIG. 4, operating conditions that initially supported HD quality—e.g., COP 0, for example—may not necessarily persist. As a result, a call management procedure during the call can cause a change in call mode, such that the call transitions to a non-HD call. For example, the RAN could send each WCD a SOCM message with COP 4, causing a switch to toll-quality voice, instead of HD quality voice. By way of example, such a change in operating conditions could occur as a result of a handoff of one or another of WCDs. More specifically, if a target cell or sector of a handoff cannot support COP 0 (or other HD capability) at the time of the handoff (or possibly at any time), the call can become a non-HD as a result of the handoff.

Conversely, a non-HD call can transition to an HD call if a change in operating conditions enables an HD capability that was not previously available during the call. A handoff is again an example of a circumstance in which such a transition may occur. For example, if a target cell or sector supports COP 0, while the source cell or sector does not, a call can transition to an HD call as a result of handoff to the target cell or sector. In principle, a call could transition between HD and non-HD multiple times over the call duration.

Under conventional operation, neither WCD engaging in a new call together, such as one illustrated by the call flow of FIG. 4, would provide any visual indication that the establish call is an HD call. Similarly, neither would provide any indication that an existing HD call has transitioned to a non-HD call, or that a non-HD call has transition to an HD. Such transitions could result from changes in operating conditions, as described above. A visual indication that a call is an HD call, such as a banner or icon displayed in a display device of a smart-phone type WCD for example, can benefit both the user of the WCD and the network service provider. The use can benefit by being able to associate the superior voice quality of HD voice with a visual cue that HD is or has become active. The network service provider can benefit because a visual cue that HD is or has become active can be a way for the network service provider to tout the superior voice quality that is can offer. Accordingly, example embodiments can cause a visual display to be presented on a WCD display device when a call is or becomes an HD call.

Figure 5:
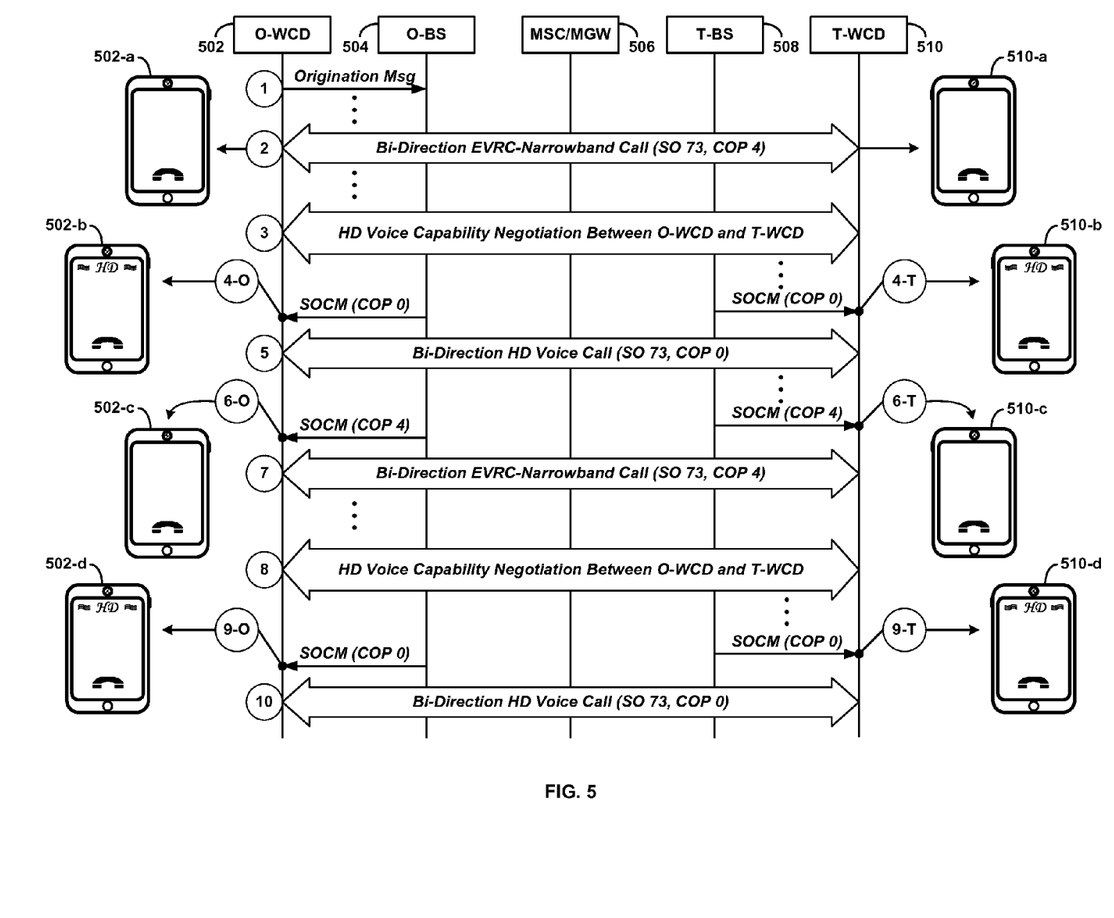
FIG. 5 is an example call flow illustrating call setup in which a customized display banner indicative of call quality could be implemented, in accordance with example embodiments.

FIG. 5 is an example call flow illustrating call setup in which a customized display banner indicative of call quality could be implemented, in accordance with example embodiments. Similarly to FIG. 4, and again by way of example, an originating WCD (labeled "O-WCD") 502 is shown as placing a call to a terminating WCD (labeled "T-WCD") 510. Network elements involved the message flow include an originating base station (labeled "T-BS") 504, an MSC/MGW (media gateway) 506, and a terminating base station (labeled "T-BS") 508. However, specific call flow messages are largely omitted. Some of the omitted messages may be the same or similar to ones described explicitly in connection with FIG. 4.

For purposes of discussion, certain aspects of phases of the call setup and call management procedure are labeled with a circled number. For purposes of illustration, in addition to being represented as a call flow element, the originating WCD 502 is also depicted in cartoon form as a smart phone with a display at four phases of an example call, labeled 502-a, 502-b, 502-c, and 502-d, on the left side of FIG. 5. Similarly, and again for purposes of illustration, in addition to being represented as a call flow element, the terminating WCD 510 is also depicted in cartoon form as a smart phone with a display at four phases of the example call, labeled 510-a, 510-b, 510-c, and 510-d, on the right side of FIG. 5.

At step 1, the O-WCD 502 initiates a call to the T-WCD 510 by sending an origination message to the O-BS 504. At step 2, a bi-directional audio connection between the O-WCD 502 and the T-WCD 510 has now been established. The codec for the call is EVRC-NW (SO 73) with COP 4, as shown. That is, the call has been set up with an HD-capable codec, but not with the HD mode selected (e.g., COP 0). The selection of COP 4 can be considered a possible default for the initial voice call setup. The vertical ellipses shown between steps 1 and 2 could correspond to call flow messages shown in FIG. 5 between steps A and B, for example.

As illustrated by way of example, the O-WCD 502-a displays a "handset" icon to indicate that the new call is active, but there is no visual indication that the call is an HD call, because at this stage it is not. Similarly, and again by way of example, the T-WCD 510-a displays a "handset" icon to indicate that the new call is active, but there is no visual indication that the call is an HD call, because at this stage it is not. It will be appreciated that a different form of icon could be used to represent an active, non-HD call.

At step 3, a negotiation procedure between the O-WCD 502 and the T-WCD 510 is carried out in order to active the HD capability of the new established call. The vertical ellipses shown between steps 2 and 3 could correspond to call flow messages shown in FIG. 5 between steps C and D, for example.

At step 4-O, the O-BS 504 sends a SOCM message with COP 0 to the O-WCD 502. This is a specific indication that the call will be established as (or transition to) an HD call. In accordance with example embodiments, upon receiving the specific indication—e.g., the SOCM with COP 0 in the example illustrated—the O-WCD 502-b displays an HD banner on its display device. This display provides a visual cue or indication that the call has been established as (or transition to) an HD call. It will be appreciated that the specific form of HD banner shown in the display of the O-WCD 502-b is illustrative, and that other forms or banner or icons could be used for the same purpose.

At step 4-T, the O-BS 508 sends a SOCM message with COP 0 to the T-WCD 510. This, too, is a specific indication that the call will be established as (or transition to) an HD call. In accordance with example embodiments, upon receiving the specific indication—e.g., the SOCM with COP 0 in the example illustrated—the T-WCD 510-b displays an HD banner on its display device. As with the O-WCD 502-b, this display provides a visual cue or indication that the call has been established as (or transition to) an HD call. It will again be appreciated that the specific form of HD banner shown in the display of the T-WCD 502-b is illustrative, and that other forms or banner or icons could be used for the same purpose.

At step 5, following the transmission and receipt of the respective SOCM messages with COP 0, a bi-directional audio connection between the O-WCD 502 and the T-WCD 510 with SO 73 and COP 0 is now established. That is, an HD call is now set up between the two WCDs. In accordance with example embodiments, at least one of the O-WCD 502 or the T-WCD 510 displays an HD banner or icon to indicate that the call is an HD call.

By way of example in the illustration of FIG. 5, for reasons not necessarily indicated in the FIG. 5, the call may transition to a non-HD call at some time after step 5. For example, a handoff of one or both to the WCDs could prompt a change in the ability of one or another air interface to support the HD call. More particularly, at step 6-0, the O-BS 504 sends a SOCM message with COP 4 to the O-WCD 502. This is a specific indication that the call will be transition to a non-HD call. In accordance with example embodiments, upon receiving the specific indication—e.g., the SOCM with COP 4 in the example illustrated—the O-WCD 502-c removes the HD banner from its display device. This display provides a visual cue or indication at the O-WCD 502-c that the call is a no longer an HD call.

At step 6-T, the O-BS 508 sends a SOCM message with COP 4 to the O-WCD 510. This is a specific indication that the call will be transition to a non-HD call. In accordance with example embodiments, upon receiving the specific indication—e.g., the SOCM with COP 4 in the example illustrated—the T-WCD 502-c removes the HD banner from its display device. This display provides a visual cue or indication at the T-WCD 510-c that the call is a no longer an HD call.

At step 7, following the transmission and receipt of the respective SOCM messages with COP 4, a bi-directional audio connection between the O-WCD 502 and the T-WCD 510 with SO 73 and COP 4 is now established. That is, the previously established call between the two WCDs has transitioned to a non-HD call. In accordance with example embodiments, whichever one or both of the O-WCD 502 and the T-WCD 510 that had displayed an HD banner or icon to indicate that the call had been an HD call now removes that HD banner or icon.

Again by way of example in the illustration of FIG. 5, and again for reasons not necessarily indicated in the FIG. 5, the call may transition back to an HD call at some time after step 7. For example, a handoff of one or both to the WCDs could prompt a change in the ability of one or another air interface to support the HD call. More particularly, at step 8, a negotiation procedure between the O-WCD 502 and the T-WCD 510 is carried out in order to active the HD capability of the new established call.

At step 9-O, the O-BS 504 again sends a SOCM message with COP 0 to the O-WCD 502. This is a specific indication that the call will transition to an HD call. In accordance with example embodiments, upon receiving the specific indication—e.g., the SOCM with COP 0 in the example illustrated—the O-WCD 502-d again displays an HD banner on its display device. This display again provides a visual cue or indication that the call has been transition to an HD call.

At step 9-T, the O-BS 508 sends a SOCM message with COP 0 to the T-WCD 510. This, too, is again a specific indication that the call will be transition to an HD call. In accordance with example embodiments, upon receiving the specific indication—e.g., the SOCM with COP 0 in the example illustrated—the T-WCD 510-d displays an HD banner on its display device. As with the O-WCD 502-d, this display once more provides a visual cue or indication that the call has been established as (or transition to) an HD call.

At step 10, following the transmission and receipt of the respective SOCM messages with COP 0, a bi-directional audio connection between the O-WCD 502 and the T-WCD 510 with SO 73 and COP 0 is again established. That is, the previously established call between the two WCDs has transitioned to an HD call. In accordance with example embodiments, at least one of the O-WCD 502 or the T-WCD 510 displays an HD banner or icon to indicate that the call is an HD call.

Further transitions between an HD and non-HD call can continue until the call ends, for example. In accordance with example embodiments, each instance in which one or another of the WCDs 502 and 510 receive a SOCM with COP 0 (or other specific indicator the call will transition to an HD call) can cause that WCD to display an HD banner or icon. Similarly, each instance in which one or another of the WCDs 502 and 510 receive a SOCM with COP 4 (or other specific indicator the call will transition to a non-HD call) can cause that WCD to remove the display of the HD banner or icon.

3. EXAMPLE WIRELESS COMMUNICATION DEVICE

Figure 6:
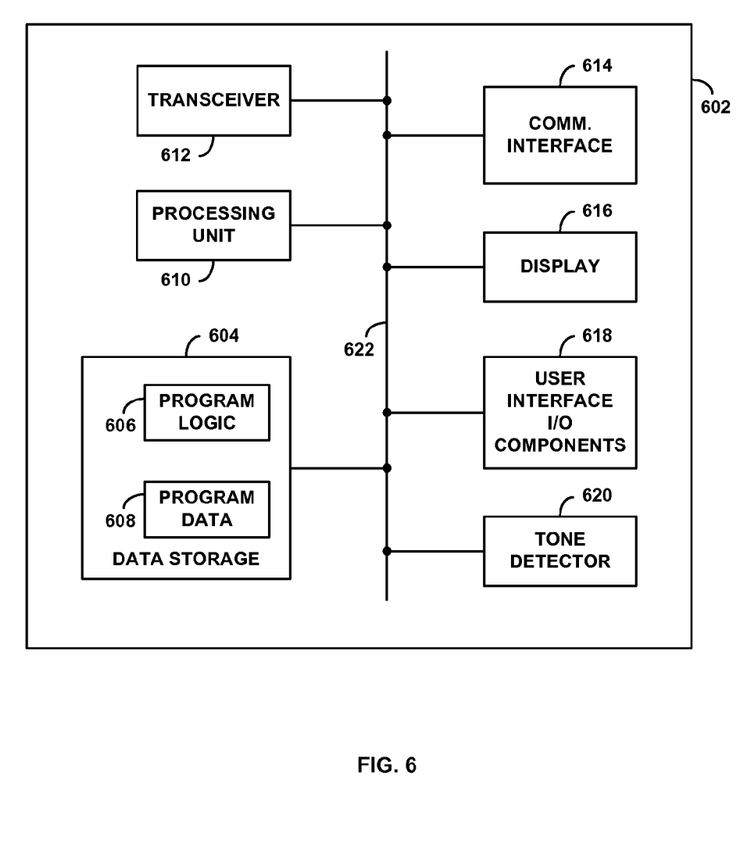
FIG. 6 is a simplified block diagram of a wireless communication device configured for carrying out an example method of a customized display banner indicative of call quality, in accordance with example embodiments.

FIG. 6 is a simplified block diagram depicting functional components of an example WCD 602 in which an example embodiment of a customized display banner indicative of call quality could be implemented. The example WCD 602 could be a cell phone, a personal digital assistant (PDA), a pager, a wired or wirelessly-equipped notebook computer, or any other sort of device. As shown in FIG. 6, the example WCD 602 includes data storage 604, processing unit 610, transceiver 612, communication interface 614, a display 616, user-interface I/O components 618, and tone detector 620, all of which may be coupled together by a system bus 622 or other mechanism.

These components may be arranged to support operation in a wireless communication network that is compliant with a variety of wireless air-interface protocols, such as network 200 illustrated in FIG. 2 and/or network 300 illustrated in FIG. 3. In particular, these components can support a customized display banner indicative of call quality, in accordance with example embodiments.

Communication interface 614 in combination with transceiver 612, which may include one or more antennas, enables communication with the network, transmission of communication units to the network, and reception of communication units from the network. The communication interface may include a module, such as an MSM™-series chipset made by Qualcomm Inc. of San Diego, Calif., and supports wireless packet-data communications according to a CDMA family of protocols.

Processing unit 610 comprises one or more general-purpose processors (e.g., INTEL microprocessors) and/or one or more special-purpose processors (e.g., dedicated digital signal processor, vocoder, application specific integrated circuit, etc.). In turn, the data storage 604 comprises one or more volatile and/or non-volatile storage components, such as magnetic or optical memory or disk storage. Data storage 604 can be integrated in whole or in part with processing unit 610, as cache memory or registers for instance. In example AT 602, as shown, data storage 604 is configured to hold both program logic 606 and program data 608.

Program logic 606 may comprise machine language instructions that define routines executable by processing unit 610 to carry out various functions described herein. In particular the program logic, communication interface, and transceiver may operate cooperatively to carry out logical operation of functions discussed above.

The display 616 could be used to display a customize banner indicating call quality, as described above. The user interface components 618 could include a keypad (or virtual keypad on the display 618), as well as other components for user interaction.

It will be appreciated that there can be numerous specific implementations of an access terminal, such as WCD 602, in which a customized display banner indicative of call quality could be implemented. Further, one of skill in the art would understand how to devise and build such an implementation. As such, WCD 602 is representative of means for carrying out a customized display banner indicative of call quality, in accordance with the methods and steps described herein by way of example.

4. CONCLUSION

An example embodiment has been described above. Those skilled in the art will understand, however, that changes and modifications may be made to this embodiment without departing from the true scope and spirit, which is defined by the claims.

We claim:

1. In a wireless communication device (WCD) operating in a wireless communication system that supports a multiplicity of modes of voice communication quality levels including a particular mode of high quality voice communication, a method comprising:
   during an existing voice call between the WCD and a different WCD operating in the wireless communication system, transitioning to the particular mode of high quality voice communication in response to a change in operating conditions experienced during the existing call by at least one of the WCD or the different WCD;
   receiving from a first base station of the wireless communication system a first message that includes a first specific indication confirming that the particular mode of high quality voice communication has become active on an end-to-end basis for the existing voice call between the WCD and the different WCD; and
   responsive to determining that the first message includes the first specific indication, displaying in a display of the WCD a particular icon signifying that the particular mode of high quality voice communication has become active.

2. The method of claim 1, further comprising:
   subsequent to displaying the particular icon, receiving from a second base station of the wireless communication system a second message that includes a second specific indication confirming that the particular mode of high quality voice communication is no longer active; and
   responsive to determining that the second message includes the second specific indication, removing the particular icon from the display of the WCD.

3. The method of claim 1, wherein receiving from the first base station of the wireless communication system the first message that includes the first specific indication comprises receiving the first message within a context of a call setup procedure that establishes a new call as the existing call.

4. The method of claim 1, wherein receiving from the first base station of the wireless communication system the first message that includes the first specific indication comprises receiving the first message within a context of a call management procedure that replaces a different one of the multiplicity of modes of voice communication quality levels that is active for the existing call with the particular mode of high quality voice communication.

5. The method of claim 2, wherein the first base station and the second base station are one of (i) the same, or (ii) different,
   and wherein receiving from the second base station of the wireless communication system the second message that includes the second specific indication comprises receiving the second message within a context of a call management procedure that replaces the particular mode of high quality voice communication with a different one of the multiplicity of modes of voice communication quality levels.

6. The method of claim 1, wherein the particular mode of high quality voice communication comprises use of a particular codec that is configured for high fidelity voice communications.

7. The method of claim 6, wherein the wireless communication system is configured to operate according to at least CDMA2000 1× Advanced,
   wherein the particular codec is specified according to Enhanced Variable Bitrate Codec (EVRC) EVRC-NW,
   and wherein receiving from the first base station of the wireless communication system the first message that includes the first specific indication comprises receiving a service option control message containing a service option parameter set to 73 and a capacity operating point parameter set to 0.

8. A wireless communication device (WCD) configured for operating in a wireless communication system that supports a multiplicity of modes of voice communication quality levels including a particular mode of high quality voice communication, the WCD comprising:
   one or more processors;
   a display device;
   memory accessible by the one or more processors; and
   machine-readable instructions stored in the memory, that upon execution by the one or more processors cause the WCD to carry out functions including:
   during an existing voice call between the WCD and a different WCD operating in the wireless communication system, transitioning to the particular mode of high quality voice communication in response to a change in operating conditions experienced during the existing call by at least one of the WCD or the different WCD;
   receiving from a first base station of the wireless communication system a first message that includes a first specific indication confirming that the particular mode of high quality voice communication has become active on an end-to-end basis for the existing voice call between the WCD and the different WCD, and
   responsive to determining that the first message includes the first specific indication, displaying in the display device a particular icon signifying that the particular mode of high quality voice communication has become active.

9. The WCD of claim 8, wherein the functions further comprise:
   subsequent to displaying the particular icon, receiving from a second base station of the wireless communication system a second message that includes a second specific indication confirming that the particular mode of high quality voice communication is no longer active; and
   responsive to determining that the second message includes the second specific indication, removing the particular icon from the display of the WCD.

10. The WCD of claim 8, wherein receiving from the first base station of the wireless communication system the first message that includes the first specific indication comprises receiving the first message within a context of a call setup procedure that establishes a new call as the existing call.

11. The WCD of claim 8, wherein receiving from the first base station of the wireless communication system the first message that includes the first specific indication comprises receiving the first message within a context of a call management procedure that replaces a different one of the multiplicity of modes of voice communication quality levels that is active for the existing call with the particular mode of high quality voice communication.

12. The WCD of claim 9, wherein the first base station and the second base station are one of (i) the same, or (ii) different,
and wherein receiving from the second base station of the wireless communication system the second message that includes the second specific indication comprises receiving the second message within a context of a call management procedure that replaces the particular mode of high quality voice communication with a different one of the multiplicity of modes of voice communication quality levels.

13. The WCD of claim 8, wherein the particular mode of high quality voice communication comprises use of a particular codec that is configured for high fidelity voice communications.

14. The WCD of claim 13, wherein the wireless communication system is configured to operate according to at least CDMA2000 1× Advanced,
wherein the particular codec is specified according to Enhanced Variable Bitrate Codec (EVRC) EVRC-NW,
and wherein receiving from the first base station of the wireless communication system the first message that includes the first specific indication comprises receiving a service option control message containing a service option parameter set to 73 and a capacity operating point parameter set to 0.

15. A non-transitory computer-readable medium having instructions stored thereon that, upon execution by one or more processors of a wireless communication device (WCD), cause the WCD to carry out functions including:
operating in a wireless communication system that supports a multiplicity of modes of voice communication quality levels including a particular mode of high quality voice communication;
during an existing voice call between the WCD and a different WCD operating in the wireless communication system, transitioning to the particular mode of high quality voice communication in response to a change in operating conditions experienced during the existing call by at least one of the WCD or the different WCD;
receiving from a first base station of the wireless communication system a first message that includes a first specific indication confirming that the particular mode of high quality voice communication has become active on an end-to-end basis for the existing voice call between the WCD and the different WCD; and
responsive to determining that the first message includes the first specific indication, displaying in a display of the WCD a particular icon signifying that the particular mode of high quality voice communication has become active.

16. The non-transitory computer-readable medium of claim 15, wherein the functions further include:
subsequent to displaying the particular icon, receiving from a second base station of the wireless communication system a second message that includes a second specific indication confirming that the particular mode of high quality voice communication is no longer active; and
responsive to determining that the second message includes the second specific indication, removing the particular icon from the display.

17. The non-transitory computer-readable medium of claim 15, wherein receiving from the first base station of the wireless communication system the first message that includes the first specific indication comprises receiving the first message within a context of a call setup procedure that establishes a new call as the existing call.

18. The non-transitory computer-readable medium of claim 15, wherein receiving from the first base station of the wireless communication system the first message that includes the first specific indication comprises receiving the first message within a context of a call management procedure that replaces a different one of the multiplicity of modes of voice communication quality levels that is active for the existing call with the particular mode of high quality voice communication.

19. The non-transitory computer-readable medium of claim 16, wherein the first base station and the second base station are one of (i) the same, or (ii) different,
and wherein receiving from the second base station of the wireless communication system the second message that includes the second specific indication comprises receiving the second message within a context of a call management procedure that replaces the particular mode of high quality voice communication with a different one of the multiplicity of modes of voice communication quality levels.

20. The non-transitory computer-readable medium of claim 15, wherein the wireless communication system is configured to operate according to at least CDMA2000 Advanced,
wherein the particular mode of high quality voice communication comprises use of a codec configured for high fidelity voice communications as specified according to Enhanced Variable Bitrate Codec (EVRC) EVRC-NW,
and wherein receiving from the first base station of the wireless communication system the first message that includes the first specific indication comprises receiving a service option control message containing a service option parameter set to 73 and a capacity operating point parameter set to 0.

* * * * *